ns patent office 3,365,065
Patented Jan. 23, 1968

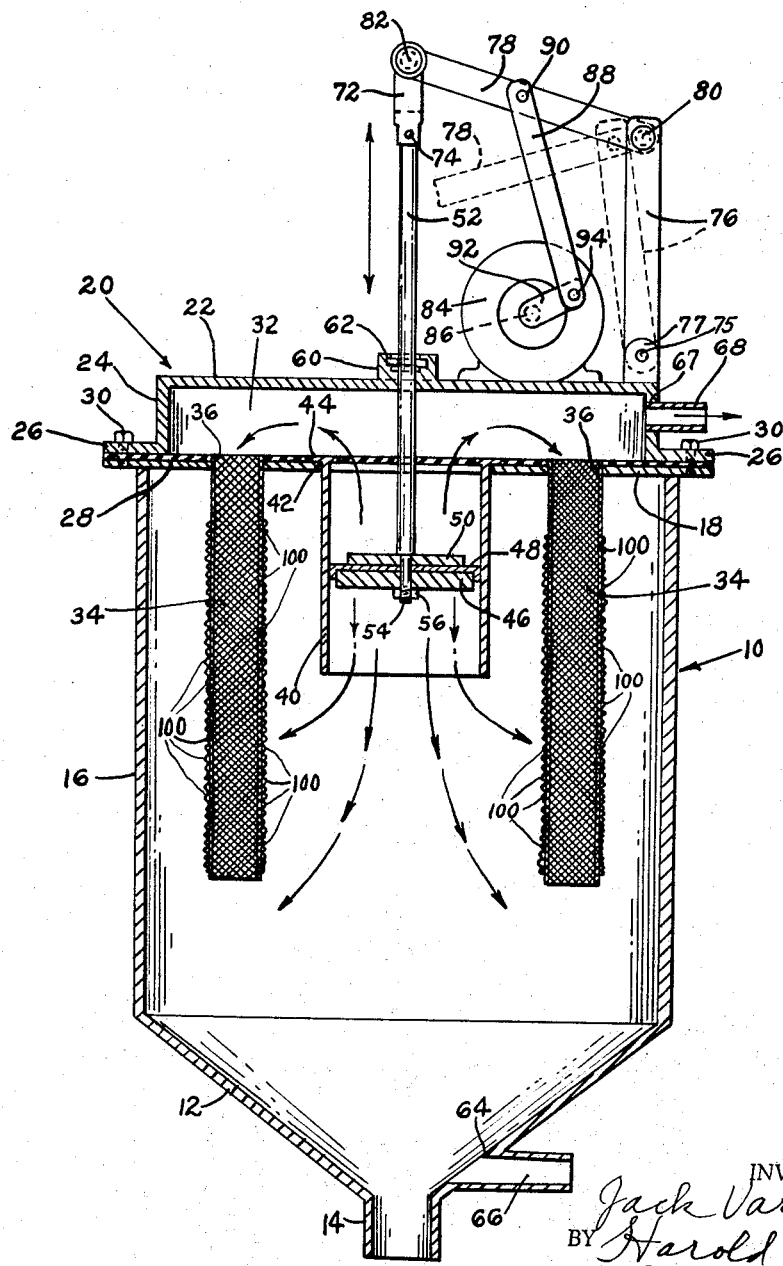

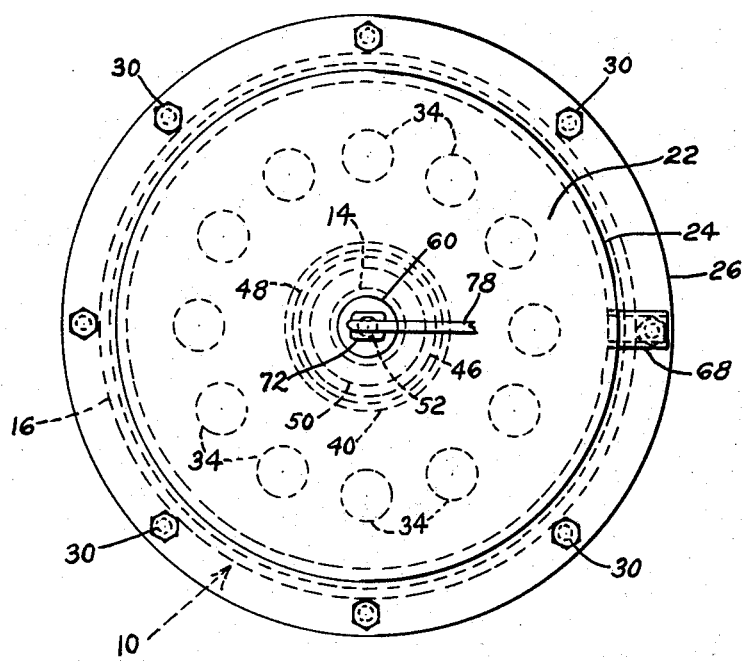

3,365,065
FILTER WITH LIQUID DISPLACING PISTON
Jack Varjabedian, 541 Chestnut St.,
Lynn, Mass. 01906
Filed Apr. 16, 1965, Ser. No. 448,640
4 Claims. (Cl. 210—332)

This invention relates to filtering apparatus, especially for use where a cleaning liquid is repeatedly used, as in clothes cleaning plants.

One object of my invention is to provide means to repeatedly displace liquid in a receptacle, as by movement of a piston, in association with filter tubes, so that the liquid will forcibly be moved into contact with said tubes and the purifying powder that commonly accumulates thereon and disperse the latter about the receptacle.

Another object is to so position said filter tubes relative to said piston that they surround the piston, thus assuring that the liquid displaced by said piston will flow approximately evenly to each tube.

A further object is to effect the desired result by a minimum of mechanism and which requires a minimum of power to operate said mechanism.

A still further object is to provide such apparatus that is simple in construction and operation, hence can be installed and repaired by relatively unskilled workmen.

The foregoing and other objects which will appear as the nature of the invention is better understood, may be accomplished by a construction, combination and operative arrangements of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

In the drawings:

FIG. 1 is a longitudinal sectional view of my apparatus, the arrows indicating the flow of the cleaning liquid as the piston moves upwardly and downwardly.

FIG. 2 is a top plan view thereof.

As illustrated, my apparatus has a receptacle 10 having a funnel-shaped side portion 12 terminating at a discharge outlet 14, controllable by the usual valve, not shown, to discharge the usual cleaning fluid, such as perchloroethylene. Extending upwardly from said side portion 12 is a vertical side portion 16 having a closure member 18 at the top thereof.

Said receptacle 10 is topped by a cover 20 having a top 22 and a depending side 24 from which latter an outer rim 26 extends laterally outward. A gasket 28 between closure member 18 and rim 26 serves as a sealer. Screws 30 hold the latter three elements 18, 26 and 28 together. The space between said closure member 18 and said top 22 provides an upper portion or chamber 32.

Attached to said closure member 18 are filter tubes 34 that extend through openings 36 in said closure member 18 downwardly into said receptacle 10 and which are open at the upper end and which communicate with said upper chamber portion 32. Said tubes may be made of monel screening, 110 mesh, for instance, and which may cover the bottom or the latter may be closed.

A cylinder 40 extends through an opening 42 in, and is attached to, said closure member 18. Said cylinder has an outer rim 44 extending laterally inward to provide a retaining member, and it also extends laterally outward as shown.

A piston 46 movably extends into said cylinder 40 being limited in its upward movement by said outer rim 44. Said piston has a gasket 48 that serves as a sealer, being retained by a block 50 above it.

A piston rod 52 passes through said block 50, gasket 48 and piston 46, being screw-threaded at one end as at 54 and held to said piston by a nut 56.

A stuffing box 60 is attached to said cover top 22 and within it is a sealing member 62, which sealing member and box 60 serve as a steadying member or guide for said piston rod 52.

An inlet passage 64 is provided at the lower part of said receptacle side 12 adjacent the bottom into which a conduit member 66 enters and through which cleaning fluid enters from a tank, not shown, in which clothes or other articles are cleaned.

Said receptacle has an outlet 67 shown as a conduit member 68 provided in said cover side 24 and through which said cleaning fluid flows to return to said clothes cleaning tank.

To actuate said piston and rod mechanically, I show a swivel member 72 that receives said rod 52, the latter being attached thereto by a pin 74. An upright 76 is pivoted as at 75 to a yoke 77 fixed to said cover top 22 and pivotally attached to said upright 76 by a stud 80 is a horizontally extending link 78. The latter is pivotally attached by a stud 82 to said swivel member 72. A motor 84 is mounted on said cover 20 and it has a shaft 86.

An upper cam lever 88 is pivotally fastened by a stud 90 to said link 78. A lower cam lever 92 is pivotally fastened at one end to said lever 88 by a stud 94 and at the opposite end to said motor shaft 86. Rotation of said shaft 86 moves said linkage which moves said piston rod 52 and piston 46 upwardly and downwardly a predetermined distance.

The filtering medium commonly used to remove impurities from the cleaning fluid is a powder such as diatomaceous earth, and I have illustrated an accumulation of it on said filtering tubes 34 by numeral 100.

Said tubes 34 are formed of screen or mesh material having fine openings that permit the cleaning fluid to pass through; but said cleaning earth or powder 100 cannot. Said cylinder and piston are preferably centrally located relative to said tubes and laterally opposite them, the distance between each said tube and said cylinder being uniform.

In operation, the cleaning fluid flows into said receptacle 10 through the inlet passage 64, having accumulated impurities from washing the clothes. In order to reach the outlet 67, it must pass through said filter tube screening, thence into said chamber portion 32 and through said outlet 67. Said circulation of the fluid has forced said earth 100 against the outside surface of said tubes as illustrated. Thus a considerable quantity of said cleaning fluid contacts said earth 100 and the latter absorbs impurities therefrom. To prevent said earth from remaining caked thereon, said piston 46 is moved up and down thus forcing considerable fluid against said earth 100. This stirring action whirls said earth about, breaking it up sufficiently to keep it from remaining caked in one place on said tubes 34, thus bringing all surfaces thereof into contact with the cleaning fluid. On its upward stroke the fluid in said cylinder is forced upwardly and into said chamber portion 32 as indicated by the arrows in said FIG. 1 that are above said piston.

Said cylinder 40 extends into said receptacle 10 a lesser distance than do said tubes, hence the distance said piston is moved is preferably considerably less than the length of said filter tubes. This makes possible movement of the cleaning liquid below the piston's lowest movement; but directly opposite said tubes, hence some liquid will forcibly contact said powder 100 before passing into the interior of said tubes. I have found that good results are obtained where the movement of the piston is one-half the length or distance the tubes extend into the receptacle.

No particular power mechanism is required to operate said piston rod 52 since it could be operated manually, should it be desired. Said piston 46 is preferably, in diameter, at least twice that of said individual tubes 34.

What I claim is:

1. Filtering apparatus comprising a receptacle having an inlet and an outlet, a plurality of filter tubes in and supported by said receptacle and having openings adapted to permit the passage of a cleaning liquid therethrough, a cylinder supported by and extending into said receptacle and being positioned laterally inward of said tubes, a piston movable in said cylinder adapted to displace said liquid during movement thereof, said cylinder and piston being so positioned relative to said filter tubes that actuation of said piston moves said liquid into contact with said tubes.

2. Filtering apparatus as set forth in claim 1, said receptacle having a closure member at the upper part thereof thereby dividing said receptacle into upper and lower portions, said filter tubes being attached to said closure member, the latter having openings therethrough, said tubes being open at the top and communicating with said closure member openings, said tubes being formed of screen material and extending farther downwardly in said lower portion than said cylinder.

3. Filtering apparatus comprising a receptacle having an inlet and an outlet and having a closure member at the upper part thereof thereby dividing said receptacle into lower and upper portions, a plurality of filter tubes attached to said closure member and extending into said receptacle lower portion and having openings adapted to permit the passage of a cleaning liquid therethrough, a cylinder supported by said closure member and extending into said receptacle lower portion, a piston movable in said cylinder and adapted to displace said liquid during movement thereof, said cylinder and piston being so positioned relative to said filter tubes that actuation of said piston is adapted to move said liquid into contact with said tubes.

4. Filtering apparatus comprising a receptacle having an inlet and an outlet and having a closure member at the upper part thereof, a plurality of filter tubes attached to said closure member and extending into said receptacle and having openings adapted to permit the passage of a cleaning liquid therethrough, a cylinder laterally inward of and centrally located relative to said tubes and supported by said closure member and extending into said receptacle, a piston movable in said cylinder and adapted to displace said liquid during movement thereof, said cylinder and piston being so positioned relative to said filter tubes that actuation of said piston causes said liquid to move into contact with said tubes, said cylinder extending into said receptacle a lesser distance than that of said tubes, said piston being, in diameter, at least twice of any of said tubes, and means supported by said receptacle limiting movement of said piston to a distance not exceeding the length of said cylinder.

References Cited

UNITED STATES PATENTS

| | | | |
|---|---|---|---|
| 2,731,107 | 1/1956 | Hersey | 55—293 X |
| 2,862,622 | 12/1958 | Kircher et al. | 210—333 |
| 2,952,363 | 9/1960 | Griswold | 210—193 |
| 2,976,953 | 3/1961 | Haas et al. | 55—341 X |
| 3,121,625 | 2/1964 | Broughton | 55—58 |
| 3,236,028 | 2/1966 | Rutan | 55—189 X |
| 3,251,473 | 5/1966 | Fuhring | 210—332 |
| 3,310,175 | 3/1967 | McLagan | 210—167 X |

FOREIGN PATENTS 40,905   1/1912   Sweden.

REUBEN FRIEDMAN, *Primary Examiner.*

W. S. BRADBURY, *Assistant Examiner.*